United States Patent [19]
Baskin

[11] 3,959,208
[45] May 25, 1976

[54] FRICTION MATERIAL CONTAINING SPINEL AS FRICTION MODIFIER

[75] Inventor: Yehuda Baskin, South Euclid, Ohio

[73] Assignee: Ferro Corporation, Cleveland, Ohio

[22] Filed: Feb. 7, 1975

[21] Appl. No.: 548,014

[52] U.S. Cl. .................................. 260/38; 106/36; 260/DIG. 39
[51] Int. Cl.² .......................... C08J 5/14; C08K 7/08
[58] Field of Search ............... 106/36; 260/DIG. 39, 260/38; 423/600

[56] References Cited
UNITED STATES PATENTS

| | | | |
|---|---|---|---|
| 3,462,387 | 8/1969 | Jensen et al. .......................... | 106/36 |
| 3,558,270 | 1/1971 | Pulty .................................. | 423/600 |

*Primary Examiner*—Donald E. Czaja
*Assistant Examiner*—S.M. Person
*Attorney, Agent, or Firm*—Milton L. Simmons; Wesley B. Taylor

[57] ABSTRACT

Friction material adapted for use, for example, as a brake lining is disclosed characterized in that the material contains a particulate normal spinel as a friction modifier. The friction material may be conventionally supported as by a shoe or disc.

15 Claims, No Drawings

FRICTION MATERIAL CONTAINING SPINEL AS FRICTION MODIFIER

BACKGROUND OF THE INVENTION

Friction material such as that used in brake lining, clutches, and the like has severe performance requirements. The principal function of a friction element like a brake lining is to convert kinetic energy to heat and to absorb the heat or otherwise dissipate it while simultaneously through the agency of friction to reduce relative movement between the friction material and a part engaged by it. To achieve these objectives, it is necessary that the coefficient of friction between the friction material and the part so engaged by as high as possible, independent of variations in operating conditions, and accomplish the necessary energy conversion with a minimum wear of contacting parts. In particular, a friction material should not only have a relatively high coefficient of friction, but as well possess durability, heat stability, generate little or no noise while in rubbing contact with an engaging part, such as a rotor, and cause a minimum of wear on the engaged part.

In general, a friction material contains a matrix or binder, such as a thermosetting resin or vulcanized rubber, a fibrous reinforcement, and a friction modifier which aids in imparting a desired coefficient of friction to the material. Often the friction material may also contain fillers or extenders which modify its physical characteristics and reduce its cost. The fibrous reinforcement is usually asbestos, although fibers of other high temperature resistant materials can be used as well or hold or bind together the components of friction material.

Under certain conditions such as overheating or contacting water, asbestos fibers have a tendency to glaze so that a lower coefficient of friction results. Subsequently, when an operator of a car, for example, attempts to operate the brake, the ability of the brake lining to perform as designed is seriously hampered and accidents have occured as a result. Accordingly, an additive friction modifier which increased the coefficient of friction would be especially useful in friction material containing asbestos as the fibrous reinforcement.

Many frictional elements like brake linings have a tendency toward "fade", which may be considered to be the inability to maintain a reasonably constant value of friction during repeated application of a brake system at a given speed, usually due to overheated brake linings. All linings exhibit fade to some extent. The inclusion of heat conducting particles, such as metal particles, in the friction material has been suggested to reduce the tendency to fade. However, this shortcoming still remains a serious problem.

It would, therefore, advance the art to provide a friction material or element having a friction modifier which when added improve the physical properties and performance of the material.

SUMMARY OF THE INVENTION

The principal object of the present invention is to provide a friction material or element that has improved performance as compared to prior friction materials, and, more particularly, a friction material that has improved coefficient of friction, higher resistance to fade, and a reduced amount of wear on a part engaged by the friction material.

These and other objects are realized by incorporating into a fibrous reinforced body or matrix of a rigid, thermosetting, heat-resistant, organic resin a sufficient amount of a crystalline mineral friction modifier consisting essentially of a particulate normal spinel to impart a desired coefficient of friction to the resulting material. The organic resin is preferably a phenolic resin such as phenol-formaldehyde, although additions of elastomers may be made to the resin to increase the friction of the material. The fibrous reinforcement is usually asbestos. The spinel should be a normal as contrasted with an inverse spinel. A desired class of spinels has the formula:

$$XY_2O_4$$

in which X represents two atoms of a monovalent metal selected from the group consisting of Na, K, Ag, and Li, or one atom of a divalent metal selected from the group consisting of Mg, Fe, Co, Mn, Zn, Ni, Cu, and Cd, and Y is a trivalent metal selected from the group consisting of Mo, W, Al, Ni, Fe, Cr, Mn, Ti, and V, except that X and Y cannot both be the same metal. Preferably X is a divalent metal and Y is a trivalent metal as defined.

The friction material may be prepared by mixing, for example, from about 20 parts to about 80 parts by weight of a liquid thermosetting resin that is in the A stage of polymerization, from about 1 part to about 20 parts of a particulate normal spinel having, for example, an average particle size of about 0.5 micron to about 10 microns, and from about 5 parts to about 40 parts of a fibrous reinforcement. In addition, fillers or extenders known in the art may be added to the mixture, if desired, up to about 30 parts by weight to vary physical properties and reduce the overall cost of the material.

The liquid mixture of A stage thermosetting resin and ground spinel may be suitably shaped as by molding, calendaring, sheeting and the like, followed by a final cure of the resin. Strips may be cut from the resulting sheet to form the present friction material and possess relatively high coefficients of friction, resistance to fade, and afford minimal wear on parts engaged by such material. The strips may then be suitably secured to a backing member such as a brake shoe or disc.

DESCRIPTION OF THE PREFERRED EMBODIMENTS

In general, friction material of the present invention comprises a fibrous reinforced, rigid, thermosetting, heat-resistant, organic resin and a crystalline mineral friction modifier consisting essentially of a particulate normal spinel present in an amount to impart a desired coefficient of friction to the material. Optionally, fillers and extenders may also be included.

phenolic thermosetting, heat-resistant, organic resin capable of withstanding the heat generated by friction material of which the resin forms may be used. As a rule, phenlic resins are best for this purpose, such as phenol-formaldehyde and phenol-furfural, but other thermosetting resins may also be used such as melamine-formaldehyde, urea-formaldehyde, epoxy resins, diallyl phthlate resins, dioctyl phthlate resins, cross-linked alkyd resins, and the like. Phenol-formaldehyde is preferred.

For some applications, elastomers may be included with the thermosetting heat-resistant organic resin to increase the frictional grab of the friction material.

Although the elastomers need not be vulcanized, vulcanizable elastomers are preferred, and for this purpose known vulcanizing and/or curing agents are included with the mix forming the friction material. The elastomer is then vulcanized at the same time as the thermosetting resin is further or finally cured. Examples of elastomers that may be used include natural rubber, butadiene-acrylonitrile, butadiene-styrene, polybutadiene, and the like. As used here and in the claims the term "rigid, thermosetting, heat-resistant, organic resin" is taken to mean a thermosetting organic resin as described and such a resin in combination with an elastomer as herein disclosed.

Spinels useful in the friction material are close-packed, crystalline oxide structures of cubic form having a three dimensional array of X, Y, and oxygen atoms, X and Y being desirable metal atoms as hereinafter defined. The spinel must be of the normal crystalline structure rather than the inverse crystalline structure in order to obtain the improved results of the present invention. According to "Structural Inorganic Chemistry" by A. F. Wells, Third Edition, Oxford University Press, 1962, page 487 and following, when X atoms are in positions of tetrahedral coordination and Y atoms are in positions of octahedral coordination, the normal spinel structure results. In certain other spinels, the X and Y atoms are arranged differently. In these, the eight tetrahedral conditions are occupied, not by the eight X atoms, but by one-half of the Y atoms, the rest of which together with the X atoms are arranged at random in the sixteen octahedral positions. These are called "inverse" spinels and are conveniently represented by $Y(XY)O_4$ to distinguish them from the normal spinel structures. Examples of inverse spinels which are not within the scope of the present invention include $Fe(MgFe)O_4$, $Fe(TiFe)O_4$, and $Zn(SnZn)O_4$.

A desirable class of normal spinels that may be used has the formula:

$$XY_2O_4$$

in which X represents two atoms of a monovalent metal selected from the group consisting of Na, K, Ag, and Li, or one atom of a divalent metal selected from the group consisting of Mg, Fe, Co, Mn, Zn, Ni, Cu, and Cd, and Y is a trivalent metal selected from the group consisting of Mo, W, Al, Ni, Fe, Cr, Mn, Ti, and V, except that X and Y cannot both be the same metal.

In the preferred class of spinels, X is a divalent metal as defined and Y is a trivalent metal as defined. The preferred spinels are $MgAl_2O_4$ and $ZnAl_2O_4$.

The mechanism whereby these spinels improve the performance of friction material such as brake material is not as yet clearly known. Presumably, the chemical composition, refractoriness, and mechanical properties of the spinels in some manner have a salutory effect. The presence in the normal spinel structure of four independent mechanical slip systems is thought to be contributory to the improved results obtained by inherently possessing desirable joint mechanical and frictional ramifications. Prior to incorporation with the thermosetting, heat-resistant organic resin, a spinel is suitably ground, as in a ball mill. Or the spinel can be synthesized in particulate form. Particle size is not critical and for most purposes an average particle of about 0.5 micron to about 10 microns provides good results.

Other additives, modifiers, fillers, extenders known in the art may be added to the thermosetting organic resin and the spinel. Such other added ingredients include, for instance, barytes, graphite, talc, litharge, kaolin, rosin, waterproofing agents such as waxes like mineral, hydrocarbon and vegetable waxes including, for example, beeswax, Montan wax, paraffin wax, ceresin wax, and the like (such waxes also lubricating the mixing together of the components of the friction material), minor amounts of oxides such as lime, zinc oxide, lead dioxide, silica sand, and manganese dioxide, sulfur (when vulcanization of an elastomer is contemplated), and the like. As used here and in the claims, the term "filler" or "filler material" is taken to include all of the foregoing and similar materials.

In like manner, the fibrous reinforcement may be fibers of any material which are capable of retaining their fibrous identity at temperatures of application of the friction material, such as glass fibers, asbestos fibers and other like mineral fibers.

Proportions are not critical. In general, the friction material contains in parts by weight from about 20 to about 80 parts of the resin, from about 5 to about 40 parts of a fibrous reinforcement, and from about one to about 20 parts of the spinel. When an elastomer is added, it may be used up to about 12 parts by weight. When filler material is used, it may be added up to about 30 parts by weight.

To prepare the present friction material, the thermosetting, heat-resistant, organic resin, while in a sufficiently low polymeric state as to be liquid, is mixed with the spinel, fibrous reinforcement, and any filler material that may be desired. When an elastomer is to be used, it may first be dissolved in a suitable solvent such as is known in the art, like methyl ethyl ketone, dimethyl sulfoxide, etc., and then added to the resin, followed in turn by the spinel, reinforcement, and any filler material that may be used. The mixture is stirred as the ingredients are added, as on a mixing mill or internal mixer, and optionally warmed until a uniform consistency is obtained. Where necessary or desired, the wet master mix may then be slowly and slightly warmed to hasten removal of the solvent.

Following this, a requisite amount of the master mix is placed in a die cavity, which has the desired geometry for the ultimate shape of the friction element, and then subjected to a pressure adapted to afford the desired density in the finally molded part. The press conditions for partially curing the master mix are determined principally by the nature of the thermosetting organic resin and are known in the art. As a rule, curing the mix at temperatures up to about 325°F for 20 to 60 minutes suffices, depending on the thickness of the part being molded.

After partial cure under pressure, the mix now shaped as a strip or lining is removed from the die and subjected to a final cure, the conditions of which again depend on the nature of the components of the friction material. In general, finally curing at temperatures of about 375°F to 425°F for 6 to 8 hours for each one-half inch thickness of strip or lining suffices.

Alternatively, the friction material can be pressed and cured in sheets, generally following the above indicated procedure, and individual friction elements then cut from the resulting sheets.

After preparing a strip or other form of the present friction material, it may be suitably secured, as by countersunk rivets or an adhesive, to a rigid backing member designed to support the friction material during its use. For example, the strip may be fastened either to a curved surface of an ordinary automotive brake shoe, where the lining is pressed against the internal surface of a rotating drum of a car wheel, or fastened to one face of a stator disc and pressed against a rotor disc secured to a car wheel. Examples of both types of application are illustrated in the figures of U.S. Pat. No. 3,477,983 to Keller. The present friction material can also be used as a brake lining in the manner illustrated by U.S. Pat. No. 1,851,087 to Denman.

The following examples only illustrate the invention and should not be construed as imposing limitations on the claims.

EXAMPLE 1

A friction material of the present invention was prepared in the following manner. A supply of $MgAl_2O_4$ was used having a melting point of 2135°C. The crystalline material was cubic with a density of 3.58 grams per cubic centimeter and a hardness on the MOH scale of 7.5 to 8. The material was synthesized at 1450°C and had an average particle size of 2.2 microns. To liquid phenol-formaldehyde in the A stage, a sufficient amount of the spinel was added to constitute 5% by weight of the resin-spinel mixture. The mixture was stirred to a substantially uniform consistency, asbestos fibers added in an amount equal to about 20% by weight of the resulting mixture, and the mixture then poured into a female mold of a die press to form a layer of about 0.5 inch in thickness. The press was closed and heated at about 325°F for about 0.5hour. When the press was opened, an integral strip of friction material was removed and finally cured at 375°F for about seven hours.

EXAMPLE 2

A procedure was carried out like the procedure of Example 1 except that the spinel was $ZnAl_2O_4$ and the master mix had this formulation in weight percent:

| Spinel | 3% |
| Beeswax | 5% |
| Kaolin | 8% |
| Asbestos fibers | 25% |
| Phenol-formaldehyde (A Stage) | Balance |

EXAMPLE 3

A procedure was carried out like the procedure of Example 1 except that the master mix had this formulation in weight percent:

| Spinel | 5% |
| Vulcanizable butadiene-acrylonitrile rubber | 7% |
| Graphite | 9% |
| White lead (rubber cure) | 6% |
| Asbestos fibers | 30% |
| Phenol-formaldehyde (A Stage) | Balance |

In preparing the master mix of this example, the butadiene-acrylonitrile rubber was dissolved in a solvent consisting of four parts by weight of methyl ethyl ketone, seven parts hydrogenated naphtha, and one-half part of water. The phenolic resin was then added and, when the mixture was of a uniform consistency by stirring, the remaining ingredients were added except for the spinel and fibers. After a uniform consistency had again been attained by stirring, the spinel was added in increments and then the asbestos while maintaining uniform consistency. The wet mixture was then warmed slightly to aid in evaporation of the solvent. Following this, the molding procedure was the same as in Example 1.

Other spinels, thermosetting resins, and filler material chosen from those previously disclosed could be used in place of the specific materials of these examples.

The normal spinels used as described impart beneficial qualities to the present friction material, such as improved coefficient of friction and resistance to fade. The wear and scoring on a mating part contacted by the present friction material are appreciably reduced, for example, for about one-half to one-third of that caused by similar friction material which does not contain normal spinels. As a result, when a drum in a brake drum or a disc in a disc brake is employed as the opposed surface engaged by a brake lining of the present invention, it need not be replaced by a new one nearly as often, since the present friction material can survive long periods of use. At the same time, the present friction material has a high coefficient of friction to provide adequate braking action.

Although the foregoing describes several embodiments of the present invention, it is understood that the invention may be practiced in still other forms within the scope of the following claims.

I claim:

1. In friction material containing a fibrous reinforced, rigid, thermosetting, heat-resistant, organic resin and a friction modifier, the improvement comprising a crystalline mineral friction modifier consisting essentially of a particulate normal spinel present in an amount of about 0.8% to about 45% by weight of said friction material and having the formula:

$$XY_2O_4$$

in which X represents two atoms of a monovalent metal selected from the group consisting of Na, K, Ag, and Li, or one atom of a divalent metal selected from the group consisting of Mg, Fe, Co, Mn, Zn, Ni, Cu, and Cd, and Y s a trivalent metal selected from the group consisting of Mo, Al, Ni, Fe, Cr, Mn, Ti, and V, except that X and Y cannot both be the same metal.

2. The friction material of claim 1 containing in parts by weight from about 20 to about 80 parts of the resin, from about one to about 20 parts of the spinel, and from about 5 to about 40 parts of reinforcing fibers.

3. The friction material of claim 2 containing up to about 30 parts by weight of filler material.

4. The friction material of claim 1 in which said resin is a phenolic resin.

5. The friction material of claim 1 in which said resin is a phenol-formaldehyde resin.

6. The friction material of claim 1 in which X is a divalent metal as defined.

7. The friction material of claim 1 in which said spinel is $MgAl_2O_4$.

8. The friction material of claim 1 in which said spinel is $ZnAl_2O_4$.

9. The friction material of claim 1 in which said particulate spinel has an average particle size of about 0.5 micron to about 10 microns.

10. A friction element comprising in parts by weight from about 20 to about 80 parts of a thermosetting phenolic resin, from about 5 to about 40 parts of reinforcing fibers, from about one to about 20 parts of a crystalline mineral friction modifier consisting essentially of a powdered normal spinel, and up to about 30 parts of filler material, said spinel having a particle size of about 0.5 micron to about 10 microns and corresponding to the formula:

$$XY_2O_4$$

in which X represents two atoms of a monovalent metal selected from the group consisting of Na, K, Ag, and Li, or one atom of a divalent metal selected from the group consisting of Mg, Fe, Co, Mn, Zn, Ni, Cu, and Cd, and Y is a trivalent metal selected from the group consisting of Mo, Al, Ni, Fe, Cr, Mn, Ti, and V, except that X and Y cannot be the same metal.

11. The friction element of claim 10 in which said phenolic resin is a phenol-formaldehyde resin.

12. The friction element of claim 10 in which said spinel is $MgAl_2O_4$.

13. The friction element of claim 10 in which said spinel is $ZnAl_2O_4$.

14. The friction element of claim 10 in which said element is a brake lining.

15. The friction element of claim 10 in which X is a divalent metal as defined.

* * * * *